United States Patent [19]

Miyazi et al.

[11] Patent Number: 4,469,293

[45] Date of Patent: Sep. 4, 1984

[54] REEL SHAFT

[75] Inventors: Kazumi Miyazi; Hideo Tomabechi, both of Tokyo, Japan

[73] Assignee: Olympus Optical Co., Ltd., Tokyo, Japan

[21] Appl. No.: 435,232

[22] Filed: Oct. 19, 1982

[30] Foreign Application Priority Data

Nov. 9, 1981 [JP] Japan .......................... 56-166836[U]

[51] Int. Cl.³ .................... G03B 1/04; G11B 15/32; G11B 23/04
[52] U.S. Cl. .................................. 242/200; 242/68.1
[58] Field of Search ............... 242/68.3, 194, 197–206, 242/68.1; 360/96.3, 132

[56] References Cited

U.S. PATENT DOCUMENTS 3,756,521 9/1973 Werner ............................ 242/200

FOREIGN PATENT DOCUMENTS 54-91809 6/1979 Japan .

Primary Examiner—Leonard D. Christian
Attorney, Agent, or Firm—Frishauf, Holtz, Goodman and Woodward

[57] ABSTRACT

A reel shaft comprises a substantially cylindrical shaft body to be fitted into a reel hub of a tape cassette for rotating the reel hub. A plurality of elongate projections are formed at regular intervals along the circumferential direction on the outer peripheral surface of the shaft body, and extend at a predetermined angle to the axial direction of the shaft body. The elongate projections on the shaft body engage or mesh with engaging projections of the reel hub to rotate the reel hub, and to push the reel hub in one direction along the axial direction of the reel shaft as the shaft body rotates.

4 Claims, 5 Drawing Figures

REEL SHAFT

BACKGROUND OF THE INVENTION

This invention relates to a reel shaft capable of engaging a reel hub of a tape cassette to give rotational force to the reel hub.

In general, a cassette tape recorder has a pair of reel shafts, which are rotated by a motor. The reel shafts individually engage a pair of reel hubs of a magnetic tape cassette to give rotational force to the reel hubs. Thus, a magnetic tape stretched between the reel hubs is wound on the reel hub on the take-up side without slack.

Conventionally, a reel shaft comprises a substantially cylindrical shaft body and a plurality of elongate projections formed on the outer peripheral surface of the shaft body. These projections are arranged at regular intervals along the circumferential direction of the shaft body, extending along the axial direction of the shaft body. Each reel hub has a plurality of engaging projections capable of engaging or meshing with the projections of the reel shaft. When the reel shaft is rotated after the reel hub is fitted on the reel shaft, the projections of the reel shaft engage the engaging projections of the reel hub to give rotational force to the reel hub. When the reel shaft is fitted into the reel hub, moreover, the extreme end faces of the engaging projections of the reel hub abut against the outer peripheral surface of the reel shaft, and the extreme end faces of the projections of the reel shaft abut against the inner peripheral surface of the reel hub. Thus, the reel shaft restrains the reel hub from moving in the directions normal to the axial direction of the reel shaft. However, the reel shaft cannot restrain the movement of the reel hub in the axial direction of the reel shaft. In a portable cassette tape recorder or a cassette tape recorder of a type in which a tape cassette is set upright, therefore, the reel hubs of the tape cassette are liable to move in the axial direction of the reel shafts, thereby causing irregular tape winding. The irregular tape winding would deteriorate tape feeding performance and/or cause wow or flutter.

These drawbacks are not peculiar to the reel shafts of cassette tape recorders, but are also found in those of video tape recorders, cinecameras, etc.

SUMMARY OF THE INVENTION

This invention is contrived in consideration of these circumstances, and is intended to provide a reel shaft capable of restraining a reel hub thereon from moving in the axial direction of the reel shaft as well as from moving in the directions normal to the reel shaft, thereby preventing irregular tape winding.

According to one aspect of the invention, a reel shaft comprises a substantially cylindrical shaft body to be fitted into a reel hub of a tape cassette and rotated, and a plurality of elongate projections formed on the outer peripheral surface of the shaft body. These projections are arranged at regular intervals along the circumferential direction of the shaft body, and extend at a predetermined angle to the axial direction of the shaft body. As the shaft body rotates, the projections engage or mesh with engaging projections of the reel hub to rotate the reel hub and to push the reel hub in one direction along the axial direction of the shaft body.

According to the reel shaft of the invention, the projections extend at a predetermined angle to the axial direction of the shaft body. Thus, the projections engage the engaging projections of the reel hub to rotate the reel hub and to push the reel hub in one direction along the axial direction of the reel shaft as the shaft body rotates. In this manner, the reel shaft restrains the reel hub from moving in the axial direction of the reel shaft. Thus, the reel shaft of the invention can prevent bouncing of the reel hub and hence irregular tape winding.

DETAILED DESCRIPTION OF THE PREFERRED EMBODIMENT

There will now be described in detail one embodiment of this invention with reference to the accompanying drawings.

Figure 1:
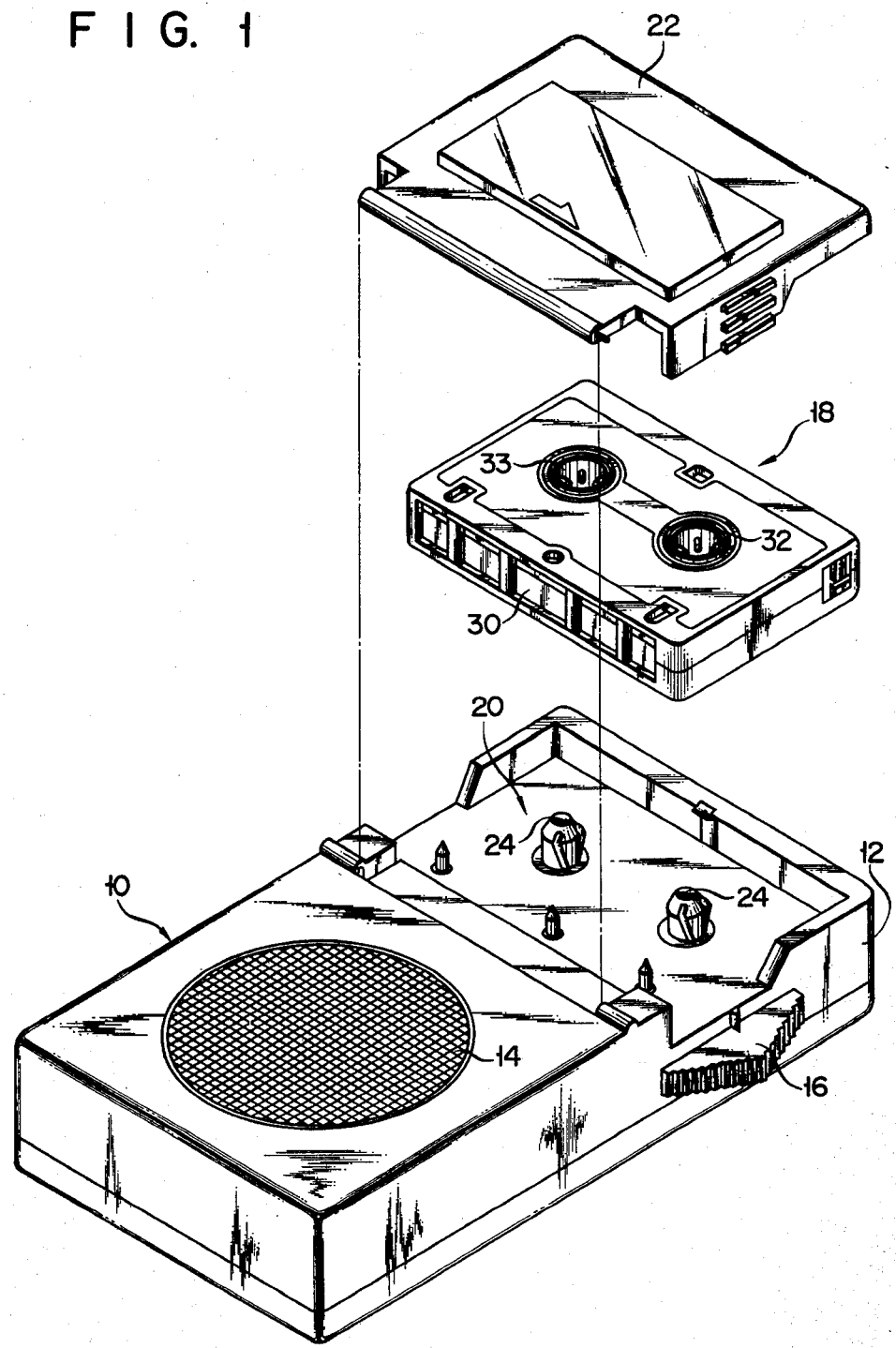
FIG. 1 is a disassembled perspective view of a cassette tape recorder with reel shafts according to one embodiment of this invention.

As shown in FIG. 1, a cassette tape recorder 10 comprises a substantially rectangular prism-shaped housing 12, a loudspeaker 14 attached to the housing 12, and also a selector switch 16. The housing 12 has a loading section 20 in which a tape cassette 18 is set. The loading section 20 is closed with a cover 22. The tape recorder 10 further comprises a pair of reel shafts 24 according to this invention which project into the loading section 20. The reel shafts 24 are rotated by driving means (not shown).

Figure 2:
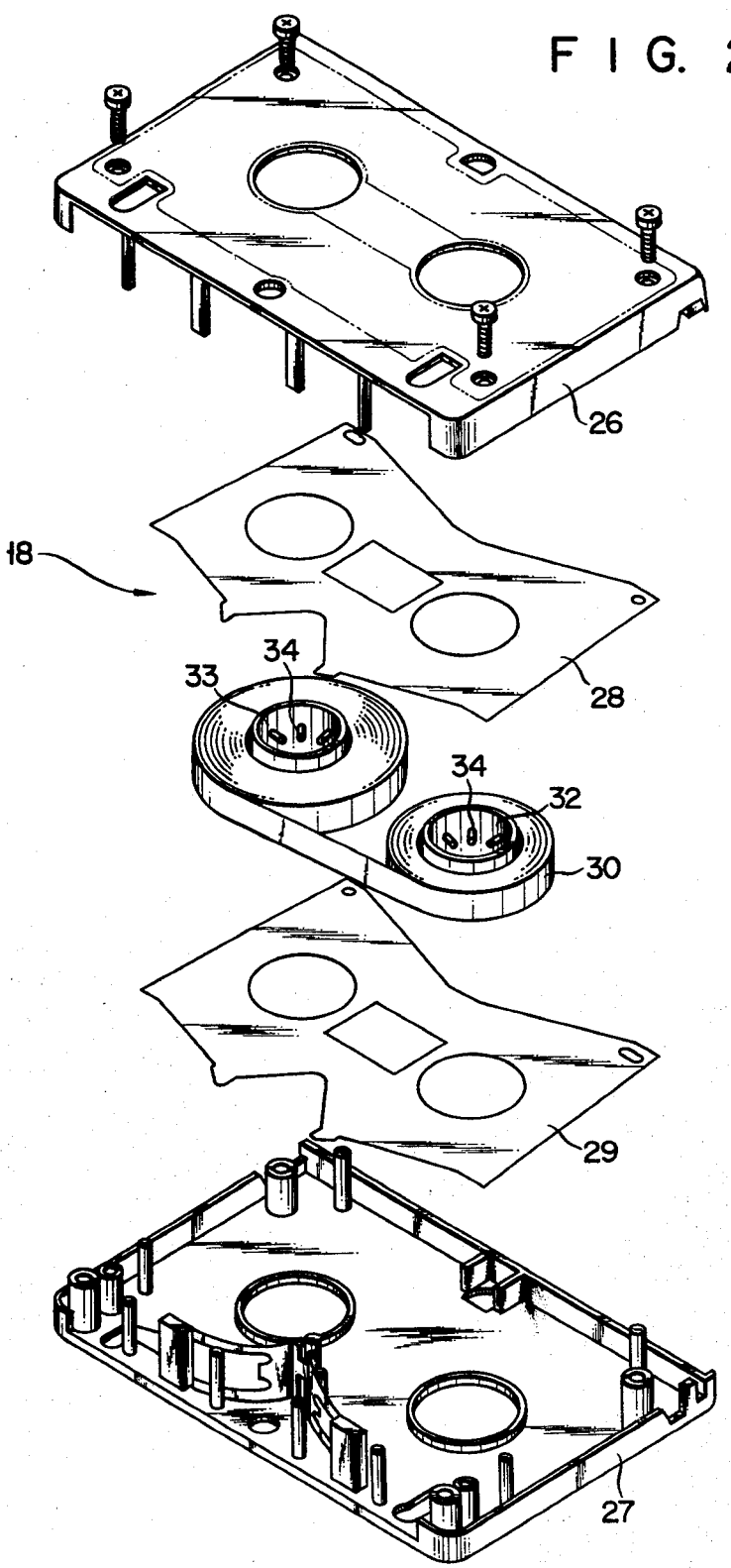
FIG. 2 is a disassembled perspective view of a tape cassette.

As shown in FIG. 2, the tape cassette 18 has a pair of cassette halves 26 and 27, a pair of liner sheets 28 and 29, and a pair of reel hubs 32 and 33 wound with a magnetic tape 30. The reel hubs 32 and 33 and the magnetic tape 30 are housed in the cassette halves 26 and 27, vertically sandwiched between the liner sheets 28 and 29. Each of the reel hubs 32 and 33 is in the form of a cylinder which has six engaging projections 34 protruding from its inner peripheral surface. When the tape cassette 18 is loaded into the loading section 20, the reel hubs 32 and 33 are fitted individually on the reel shafts 24.

Figure 3:
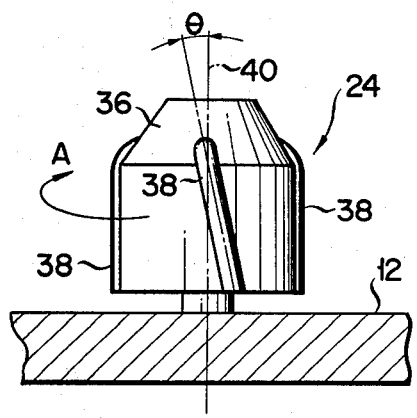
FIG. 3 is an enlarged side view of the reel shaft.
Figure 4:
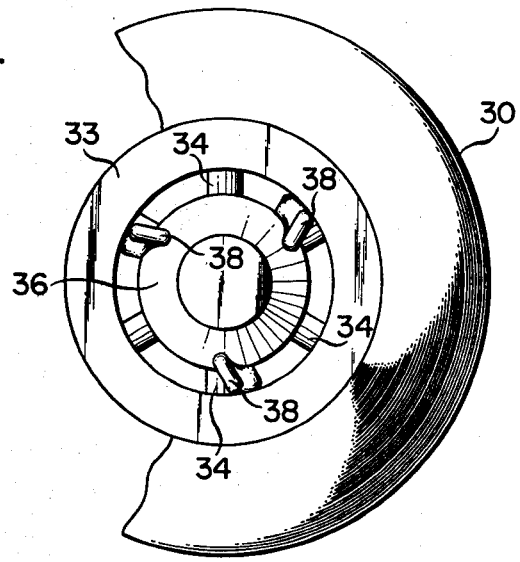
FIG. 4 is a plan view schematically showing how the tape cassette is mounted on the reel shaft of FIG. 3.

As shown in FIGS. 3 and 4, each reel shaft 24 has a substantially cylindrical shaft body 36 rotated in the direction indicated by arrow A, and three elongate projections 38 formed on the outer peripheral surface of the shaft body 36. The projections 38 are arranged at regular angular intervals of 120° along the circumferential direction of the shaft body 36, each extending at an angle $\theta$ to the axial direction of the shaft body 36. Namely, each projection 38 is inclined at the angle $\theta$ to the central axis 40 of the shaft body 36 in the direction indicated by arrow A.

When the tape cassette 18 is loaded into the loading section 20, the reel shafts 24 are individually fitted into the reel hubs 32 and 33. As a result, the extreme end faces of the projections 38 of each reel shaft 24 abut against the inner peripheral surface of the reel hub 32 or 33, while the extreme end faces of the engaging projections 34 of each reel hub abut against the outer peripheral surface of the shaft body 36, as shown in FIG. 4.

Figure 5:
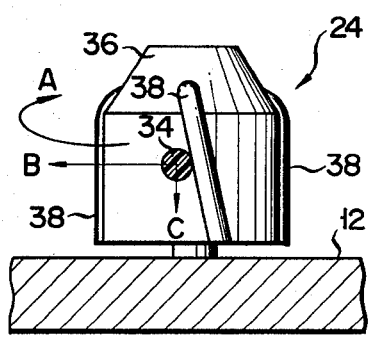
FIG. 5 is a side view schematically showing how the reel shaft of FIG. 3 engages a reel hub of the tape cassette.

Thus, the reel shafts 24 restrain the reel hubs 32 and 33 from moving in the directions normal to the axial direction of the reel shafts 24. In this state, when the reel shaft 24 on the driving side is rotated in the direction indicated by arrow A, the projections 38 of the reel shafts 24 engage the engaging projections 34 of the reel hubs 32 and 33, individually, as shown in FIG. 5. Then, the projections 38 push their corresponding engaging projections 34 of the reel hubs 32 and 33 in the direction indicated by arrow B to give rotational force to the reel hubs 32 and 33. Inclined at the angle θ in the rotating direction of the reel shafts 24, the projections 38 of the reel shafts 24 push the engaging projections 34 of the reel hubs 32 and 33 also in the direction indicated by arrow C. As a result, the reel hubs 32 and 33 are pushed in the direction indicated by arrow C, that is, downward along the axial direction of the reel shafts 24. Thus, the reel hubs 32 and 33 are normally pushed downward while rotating, to be restrained from moving in the axial direction of the reel shafts 24.

As described above, the reel shaft 24 comprises the shaft body 36 and the projections 38 which are inclined at the angle θ to the axial direction of the shaft body 36 in the rotating direction of the reel shaft 24. Thus, the reel shaft is arranged so that the reel hub thereon is restrained from moving in the axial direction of the reel shaft, as well as from moving in the directions normal to the axial direction of the reel shaft as is also the case with the prior art reel shaft. In this manner, the reel shaft can prevent bouncing of the reel hub in the tape cassette and hence irregular winding of the magnetic tape. If the reel hubs are pushed in the axial direction of the reel shafts, they will come into contact with one of the cassette halves to increase frictional resistance. Since the reel hubs are pushed by the reel shafts with constant force, however, torque on the reel hubs varies only slightly, and wow or flutter can thus be prevented.

This invention is not limited to the embodiment described above. For example, the number of the projections of each reel shaft is not limited to three, and may be increased or decreased as required. Moreover, the projections may be inclined in the opposite direction to the rotating direction of the reel shafts. In this case, the reel hubs are pushed upward along the axial direction of the reel shafts to be restrained from moving in the axial direction of the reel shafts. The reel shafts of the invention are not limited to use in cassette tape recorders, but may also be applied to video tape recorders, cinecameras, and the like.

What we claim is:

1. A reel shaft for engaging a substantially cylindrical reel hub of a tape cassette having a plurality of engaging projections protruding from the inner peripheral surface of the reel hub, to impart rotational force to the reel hub, comprising:

a cylindrical shaft body to be fitted into the reel hub for rotatably driving the reel hub about the axis of said shaft body, said shaft body having a base end and a distal end opposite said base end in the axial direction of said shaft body, the distal end portion of said shaft body being tapered for freely entering the reel hub without interference with the engaging projections of the reel hub; and a plurality of elongate projections formed at regular intervals in the circumferential direction on the outer peripheral surface of said shaft body, said elongate projections each extending in the long direction to define a predetermined angle to the axial direction of the shaft body, and extending from said base end to the vicinity of said distal end of said shaft body so that said elongate projections engage the engaging projections of the reel hub for rotating the reel hub and for urging the reel hub in the axial direction of said shaft body as said shaft body rotates.

2. The reel shaft according to claim 1, wherein said elongate projections on said shaft body are inclined at a predetermined angle to the axial direction of the shaft body in the rotating direction of the reel shaft so that the reel hub is urged toward the base end of said shaft body as said shaft body rotates.

3. The reel shaft according to claim 1, wherein said elongate projections each have a uniform cross-section over the length of the projection on the surface of said shaft body.

4. The reel shaft according to claim 1, wherein said elongate projections on said shaft body are inclined at a predetermined angle to the axial direction of the shaft body in the opposite direction to the rotating direction of the reel shaft so that the reel hub is urged toward the distal end of said shaft body as said shaft body rotates.

* * * * *